July 2, 1929.  E. L. FICKETT  1,719,803
GEARING
Filed May 9, 1928  2 Sheets-Sheet 1

Inventor
Ernest L. Fickett
By his Attorney
Maurice B Landis

July 2, 1929.  E. L. FICKETT  1,719,803
GEARING
Filed May 9, 1928  2 Sheets-Sheet 2

Inventor
Ernest L. Fickett
By his Attorney

Patented July 2, 1929.

1,719,803

UNITED STATES PATENT OFFICE.

ERNEST L. FICKETT, OF FITCHBURG, MASSACHUSETTS, ASSIGNOR, BY MESNE ASSIGNMENTS, TO SCURLOCK GEAR CORPORATION, OF NEW YORK, N. Y., A CORPORATION OF NEW YORK.

GEARING.

Application filed May 9, 1928. Serial No. 276,276.

The present invention relates to transmission mechanism and has for an object to provide an improved gearing.

The invention has been developed in connection with the production of a differential mechanism for use in driving the rear wheels of a motor vehicle and as a convenient illustration of the principles of the invention such an embodiment has been selected for particular description. It will be understood, however, that the description is illustrative merely and is not intended as defining the limits of the invention which may be variously applied.

The nature and objects of the invention will be better understood from a description of the particular embodiment for the purposes of which description reference should be had to the accompanying drawings forming a part hereof and in which—

Figure 1:
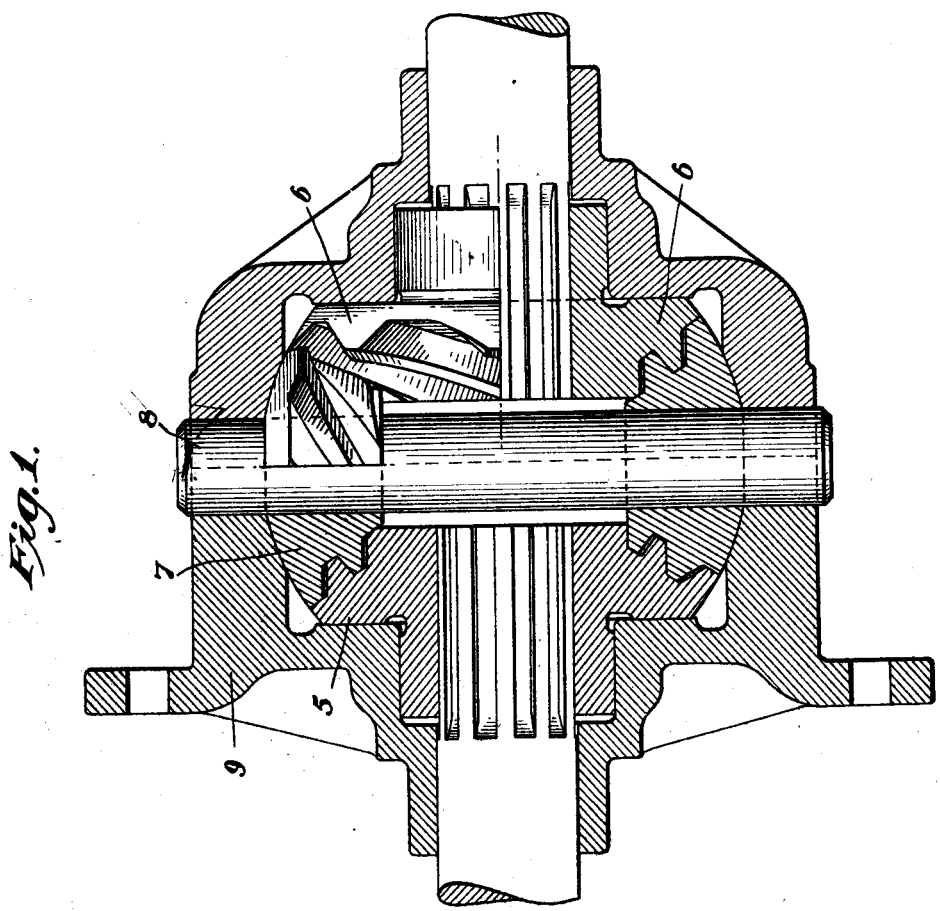
Figure 2:
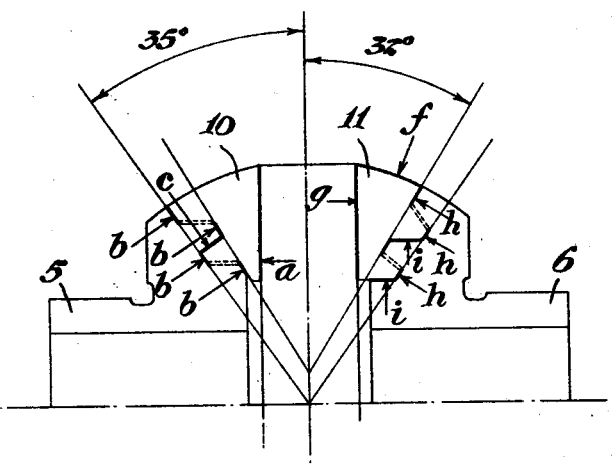
Figure 3:
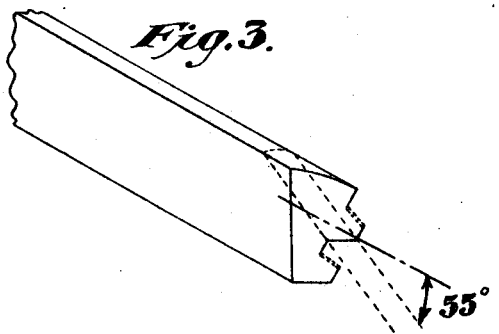
Figure 4:
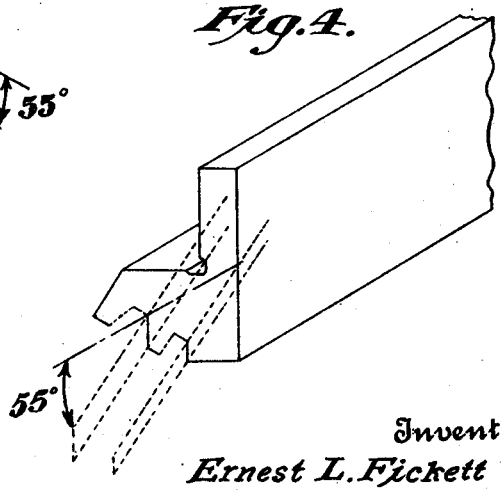

Figure 1 is a central sectional view of a differential mechanism constructed in accordance with the invention, Figure 2 is a diagrammatic sectional view on which are indicated certain stresses, and Figures 3 and 4 are diagrammatic views showing wedges, the angles of which correspond to the angles of momentarily operative portions of the planet pinion to illustrate the operation of the apparatus.

The differential mechanism shown for the purpose of illustrating the invention comprises the two side gears 5 and 6 with planet pinions 7 mounted on the radially transverse planet pinion schaft 8 in the differential casing 9. The teeth of the side gears and the planet pinions are so arranged that the two side gears and the wheels driven thereby can be driven with substantially equal force by power applied through the differential casing and the planet pinions whenever both rear wheels of the vehicle have traction, and yet the tendency of one wheel to spin when its traction is reduced is practically eliminated. In the particular gearing illustrated, the desired results are obtained by the spiral arrangement of the teeth. The gears shown as regards the length of the teeth along the pitch cone have the Archimedean spiral shape and may be cut according to the involute system but the invention is not restricted to this form.

The tops of the teeth of each gear preferably bottom against the body of the mating gear with no clearance. By this arrangement there are surfaces engaging each other with practically a sliding contact to resist longitudinal thrust of the pinions inwardly, the contacting surfaces engaging each other in planes substantially parallel to the pitch surfaces at the point where said pitch surfaces engage each other. This feature whereby the thrust is resisted by surfaces coacting in planes at an angle to the planes of driving engagement may be applied to gearing other than differential gearing.

No attempt will be made herein to analyze thoroughly the distribution of stresses in the gearing shown. A general discussion of the stresses under illustrative conditions will aid an understanding of the invention.

Each side gear is driven upon rotation of the differential casing through the planet pinions. These pinions may be considered as acting as do the planet pinions of a bevel gear differential mechanism or, and more accurately for present purposes, each planet pinion may be considered as comprising two wedges, each engaging one side gear and resisting relative rotation between the side gear and the differential casing. So considered each wedge tends to move at a right angle to the plane through the planet pinion shaft and the vehicle axles, that is to say at a right angle to the plane of the paper in Figures 1 and 2. Each wedge has one tapered surface engaging the face of a side gear and other faces all parallel to its axis and direction of movement.

The shapes of the wedges can be obtained by cutting the pinion on two parallel planes close together and on either side of its axis. The several surfaces may be considered as plane instead of curved without introducing objectionable error. By this analysis, it will be clear that all surfaces of the supposed wedges will be parallel to the axes of the wedges, except the surfaces which engage the teeth of the side gears and these surfaces will have the angle of the spiral teeth. In Figures 3 and 4 are shown in perspective hypothetical wedges 10, 11 which have effective surfaces extending in the directions of the actual engaging surfaces of the gearing under consideration as above indicated, but which are shown as long enough to be more easily visualized. From the foregoing, it will be clear that the same effect in driving the side gears could be obtained momentarily if the two wedges 10 and 11 were substituted for the planet pinion and means provided for moving one wedge forward as the other moves backward.

Now, suppose that with the wedges in place the right vehicle wheel, Figure 1, runs on a slippery pavement, the driving pressure between the side gear 5 and the wedge 10 will tend to move said wedge longitudinally but because it is a wedge much of the power applied will be resisted by the friction of the wedge against relatively fixed surfaces, and only a part of the force will be operative to move the wedge longitudinally. This part of the force will be resisted by the wedge 11 which must be moved forward if the wedge 10 is moved rearward and this force as applied to move the wedge 11 forward will be resisted by friction and the resistance which the side wheel 6 offers to being rotated. When we note that the friction of both wedges is opposed to the spinning of the wheel, it will be clear that a small traction on the wheel, the right wheel in this analysis, will be sufficient to maintain the wedge 10 in non-yielding, driving relation. The arrangement results therefore in maintaining power on whichever wheel has traction on the road, because the wheel, the traction of which is reduced, does not spin so long as there is sufficient traction on it to prevent its being spun through the gearing which is very ineffective when operating so to drive. On the other hand, when the vehicle turns, relative backward movement of one of the side gears is immediately permitted because the effect is that of withdrawing one wedge. The angle of the teeth, that is to say the taper of the wedges, is such as to prevent binding while providing such an efficiency ratio as will prevent spinning of one wheel under conditions usually found. Gears having teeth cut at an angle averaging approximately 55 degrees to the direction of the pitch circle have been found effective in practice.

It is an important feature of the mechanism shown that the gears have bottoming contact, that is to say the tops of the teeth of one gear engage the roots or bottoms between teeth of the other intermeshing gear in each case. The advantage of this arrangement will be clear from study of the distribution of stresses, as indicated in Figure 2. In said figure the stresses which would bear on the wedge 10, (or the planet pinion) when it is crowded to its limit position by driving pressure against the side gear 5, are indicated by the arrows, $a$, $b$, $c$, and the stresses on the wedge 11 when crowded by side gear 6 are indicated by the arrows $f$, $g$, $h$, $i$. The fact that in usual operation the stresses on opposite sides of the pinion will counteract each other should be borne in mind, but at times one side or the other of the differential will be transmitting the major part of the power and the conditions indicated for one side will obtain.

Considering the stresses indicated at $a$, $b$, $c$ on the wedge 10, it will be clear that if the teeth did not bottom the stresses indicated by the arrows $b$ would not exist and the other stresses would tend to tilt the planet pinion shaft. The bottoming of the gears redistributes the pressures in a way that reduces the tendency to breaking and reduces wear on the pinions and shafts.

The outer end of the planet pinion is shown as curved and the outer faces of the teeth of the side gears as parallel to the axis thereof. This arrangement has been found effective in practice but it will be clear from consideration of the stresses that variation in this arrangement may be made to redistribute pressures in the gearing if desired.

It will be understood that the principles of the invention may be variously applied without departing from the spirit of the invention as defined in the appended claims.

I claim:

1. A pair of spiral bevel gears adapted to intermesh with each other, the teeth of each of which gears project far enough to bear on the surface between two adjacent teeth of the other gear.

2. A pair of spiral bevel gears, one having its teeth as long as the distance between the base circles of the two gears, whereby the ends of said teeth will bear on the spaces between the teeth of the other.

3. In a differential mechanism, the combination of side gears and pinions having spiral teeth, the tops of the teeth of each pinion bearing on the bottoms of the spaces between the teeth of the side gears.

4. In a differential mechanism, the combination of side gears and pinions of a bevel character and having curved teeth, the tops of the teeth of each gear bearing on the bottoms of the spaces between the teeth of the pinions.

5. A differential mechanism comprising gears and pinions having teeth of sufficient height to bear on the bottoms of the spaces between the teeth of the intermeshing gear or pinion.

6. A pair of intermeshing spiral bevel gears having rolling contact on surfaces lying at an angle to each other, one set of surfaces constituting driving surfaces and one set constituting thrust resisting surfaces.

7. A pair of intermeshing spiral bevel gears having teeth, the engaging faces of which are formed with surface areas coacting with driving engagement and with other surface areas coacting to resist longitudinal thrust.

8. A pair of intermeshing gears, whose pitch surfaces are in rolling contact, having surfaces engaging each other in a plane substantially parallel to the pitch surface at the point of driving engagement and other surfaces engaging each other with driving contact in planes at an angle thereto.

9. A differential mechanism comprising, in combination, a differential casing, side gears rotatably mounted therein, and planet pinions engaging both side gears, the side gears and planet pinions having interengaging teeth in rolling contact on their opposed faces and on conical surfaces.

10. A differential mechanism comprising, in combination bevel spiral side gears and a bevel spiral pinion in rolling contact with both side gears on surfaces lying at an angle to each other, one set of surfaces constituting driving surfaces and one set constituting thrust resisting surfaces.

In testimony whereof, I have signed my name to this specification this 30th day of April, 1928.

ERNEST L. FICKETT.